United States Patent [19]

Nemecz et al.

[11] 3,956,454

[45] May 11, 1976

[54] PROCESS FOR PRODUCING ALUMINUM TRICHLORIDE

[75] Inventors: Ernö Nemecz, Budapest; Aurél Ujhidy, Veszprem; Oszkár Borlai; Karoly Polinszky, both of Budapest; Janos Szepvolgyi, Veszprem; Tamas Szekely, Budapest; Lászlóné Szabó, Tatabanya; Szilard Riederauer, Budapest, all of Hungary

[73] Assignee: Toth Aluminum Corporation, New Orleans, La.

[22] Filed: Nov. 16, 1973

[21] Appl. No.: 416,676

[30] Foreign Application Priority Data
Sept. 28, 1973  Hungary.................................. 14980

[52] U.S. Cl............................... 423/136; 423/137; 423/496
[51] Int. Cl.$^2$.......................... C01F 7/56; C01F 7/60
[58] Field of Search...................... 423/496, 136, 137

[56] References Cited
UNITED STATES PATENTS

| 359,601 | 3/1887 | Frishmuth | 423/496 |
|---|---|---|---|
| 1,375,116 | 4/1921 | Shoeld | 423/496 |
| 1,803,720 | 5/1931 | Miner | 423/136 |
| 1,814,397 | 7/1931 | McAfee | 423/136 |
| 2,832,668 | 4/1958 | Culberson et al. | 423/136 |
| 3,812,241 | 5/1974 | Piccolo et al. | 423/136 X |
| 3,842,163 | 10/1974 | Russell et al. | 423/136 X |

*Primary Examiner*—Edward Stern
*Attorney, Agent, or Firm*—Holman & Stern

[57] ABSTRACT

The instant invention is particularly useful for using low-grade carbonaceous material to form aluminum-trichloride. Aluminous material and the carbonaceous material are comminuted either separately or together, and then the aluminous and carbonaceous materials are either compacted or mixed with a binder to form a doughlike paste. The compacting or mixing with the binder to form the dough-like paste is to insure that the particulate aluminous and carbonaceous materials have extremely close and intimate contact. The mixture is then calcined and chlorinated at an elevated temperature to form aluminum trichloride.

6 Claims, 6 Drawing Figures

EFFECT OF COMMINUTION ON CHLORINATION

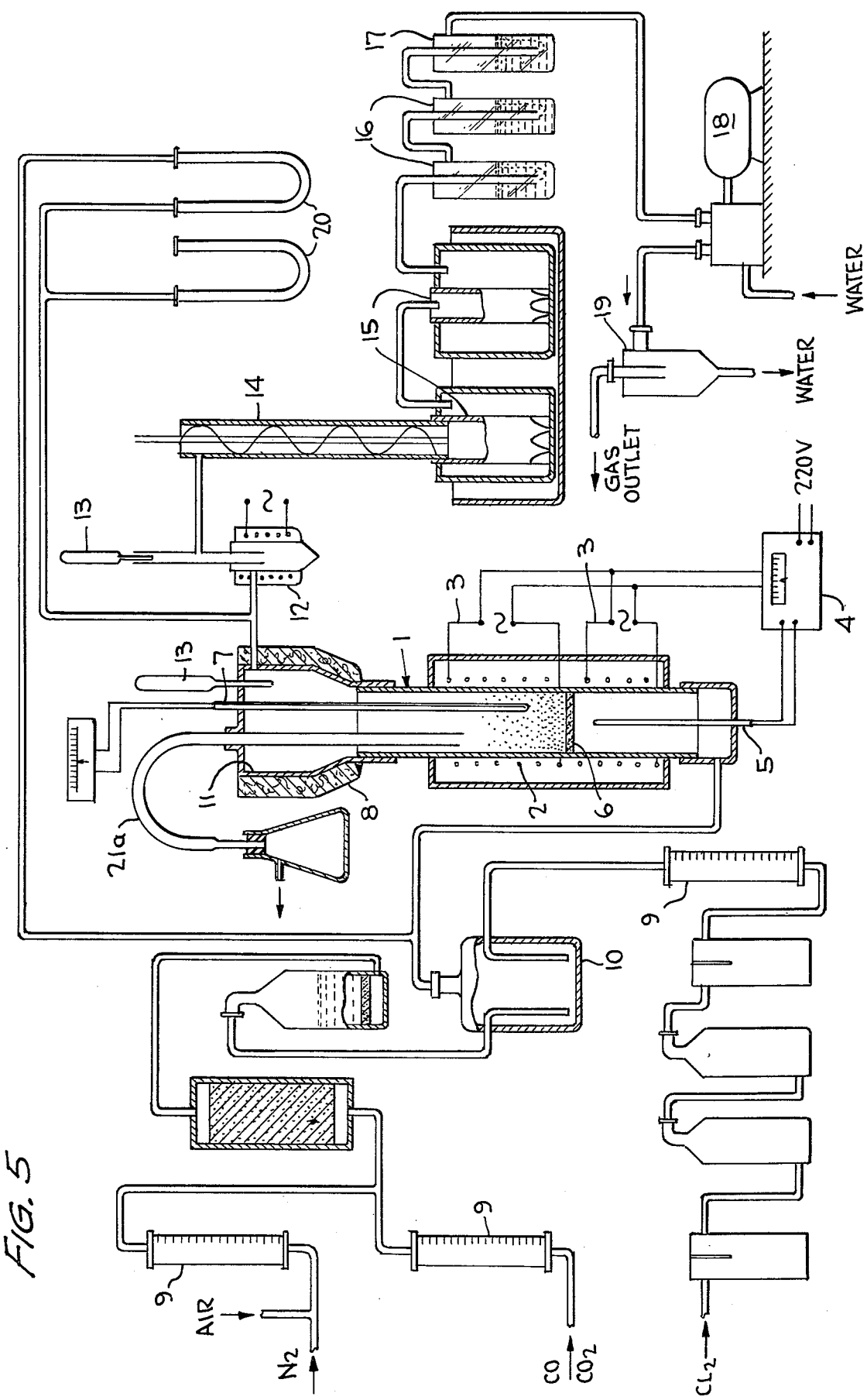

PROCESS FOR PRODUCING ALUMINUM TRICHLORIDE

BACKGROUND OF THE INVENTION

This invention involves carbo-chlorination of aluminous material, and relates to previous patents assigned to Applied Aluminum Research Corporation which disclose novel processes for producing essentially pure, metallic aluminum from clay, bauxite, or other aluminous ores. In order to better understand how the invention described herein is to be utilized, it is desirable to briefly outline the main features of those several patents assigned to Applied Aluminum Research Corporation. The broad process divulged in these patents is also known as the "Toth Process", after its principal inventor, and in the descriptive material given below this terminology will be used.

In its most basic form, the Toth process consists of four prime steps:

I. Carbo-chlorination of aluminous material to form aluminum trichloride;

II. Reduction of the aluminum trichloride with manganese to form elemental aluminum and manganese dichloride;

III. Oxidation of manganese dichloride to give one or more forms of manganese oxide and chlorous gases;

IV. Reduction of these manganese oxides to form manganese metal.

In the various processes previously patented, provision is made to recycle the manganese produced in Step IV for reutilization in Step II, and further to recycle chlorine liberated in Step III for reuse in Step I. Depending on the particular application, recycling may be external, or may be accomplished internally, as for example by the use of different reaction zones in a contactor. Recycling of these streams is necessary and desirable to minimize make-up costs for operation of the Toth process and to thus make the process economically competitive.

The four steps outlined above, in combination or separately, can be carried out in a variety of ways; U.S. Pat. Nos. 3,615,359, 3,615,360, 3,644,742, 3,713,809, and 3,713,811 give techniques for implementing the steps.

As can be seen from this brief description, carbo-chlorination of clay, bauxite, or other aluminous material is an integral and necessary part of the Toth process, and effective and economic means of carrying out Step I are necessary for the overall success of the Toth process. In the current invention, new and novel techniques are described for carrying out this carbo-chlorination of aluminous material.

In order to more fully comprehend how the current invention is related to past practice and technology, a brief description of earlier commercial processes for carbo-chlorination of aluminous materials will be given, to be followed by a description of the current invention.

Manufacture of aluminum trichloride ($AlCl_3$) from aluminous materials is not new technology; it has been known and practiced for well over 100 years. At least two processes for such production have been operated commercially, the so-called Gulf and the Badische Anilin and Soda Fabrik (BASF) processes. In the Gulf process as developed and improved the following steps were employed: (1) coke and bauxite were ground, mixed, and calcined at approximately 770°C in a rotary kiln to remove free and combined water and fully carbonize the coke, (2) the hot calcined mixture was stored and fed intermittently at 4-hour intervals to the chlorination reactors, (3) a chlorine-oxygen mixture was fed to the bottom of the chlorinator reaction vessels and feed rate was adjusted such that reaction of the chlorine was complete, and (4) $AlCl_3$ vapor from the reactor system was condensed and collected. In the BASF process, chlorination was accomplished in the following fashion: (1) a mixture of carbon monoxide (CO) and chlorine ($Cl_2$) was pretreated by heating to reactor temperature (approximately 900°C) in a charcoal contactor; in addition to simply heating the mixture, partial conversion of these materials to phosgene was claimed to occur in this contactor, (2) the $CO-Cl_2$ mixture was passed over a bed of either bauxite or alumina situated in a shaft furnace, and in which chlorination took place, and (3) $AlCl_3$ vapor was recovered by subsequent condensation.

It is significant that in both of these cases of commercial production of $AlCl_3$, high quality aluminous material (either bauxite or alumina) was used as the raw material. The following U.S. Pats. are exemplary of chlorination of clay, Nos. 1,238,604, 1,507,709, 1,858,252, and 2,238,421, however, none have been practiced commercially because of low conversion rates and poor yields. In view of highly limited domestic bauxite reserves, and concomitantly, the availability of large domestic clay deposits, it is apparent that effective techniques for chlorination of clay are highly desirable for future growth of the Toth process in the United States. Further, extensive clay deposits are to be found world-wide, and methods for clay chlorination would be applicable to these reserves.

In addition to the requirement of very high quality aluminous ores, the processes described above require high quality coke or charcoal as the reducing agent in the carbo-chlorination. Because of the much greater distribution and comparatively low costs of lower grade carbonaceous material (e.g. brown coal, lignite, etc.), methods of employing this material as a reducing agent would be highly desirable.

It is apparent from the foregoing discussion that effective carbo-chlorination of clay, or other aluminous material, by utilizing low grade coal as the carbon source, would be a valuable improvement to the Toth process. In addition, the $AlCl_3$ so produced could find markets for many other purposes as well, including use in electrolytic methods for producing metallic aluminum from $AlCl_3$ and uses as a catalyst in chemical and petroleum processing operations.

SUMMARY OF THE INVENTION

The instant invention is based on the concept that low grade aluminous material, including kaolin and illite, can be effectively and rapidly chlorinated in a reducing atmosphere to give as one principal product aluminum trichloride. Unexpectedly rapid and high conversion to $AlCl_3$ can be obtained with this aluminous material by: (1) grinding the aluminous material and a suitable coallike reductant material, either separately or together, (2) admixing the two materials, (3) compressing the mixture into tablets or briquets, or mixing with a binder to form a paste-like dough to give an intimate mixture of these two materials, and (4) chlorinating the mixture in compressed or paste-like form with a stream containing chlorine and/or chlorine compounds. Chlorination is carried out at an elevated temperature of from 600°–1100°C with the optimum reaction temperature being in the range of 900°–1000°C for a duration of ¼–4 hours. Low grade coal or sub-bituminous material can function effectively as the reductant material. Included in this class of compounds are brown coal and lignite.

BRIEF DESCRIPTION OF THE DRAWINGS

FIG. 5 shows in diagrammatic form and experimental apparatus in which fluidized bed carbo-chlorinations of aluminous materials were carried out.

DETAILED DESCRIPTION OF THE PREFERRED EMBODIMENTS

Production of $AlCl_3$ by reaction of chlorine and/or chlorine-containing compounds with an aluminous bearing material in a reducing atmosphere is made possible in accordance with the present invention by the following steps:

1. The aluminum-bearing ore (clay, illite, bauxite, alumina or other material) is first pretreated. The pretreatment step may entail grinding, drying, and calcining, or in some cases simply grinding to a suitable size and drying. If calcination of the aluminous material is not initially carried out, it can be included as a precursor to the chlorination step, i.e., following Step 3, below.

2. Carbonaceous material is ground to a suitable size in a similar fashion. Because of the friable nature of the clay or other aluminous material, grinding Steps 1 and 2 are preferably carried out separately.

3. The aluminous material and carbon-containing material are thoroughly mixed, and the admixture is compressed to give tablets or briquets of, for example, clay and brown coal. In some cases (for example if a fluidized bed is to be employed for later processing) it may prove desirable to recrush or regrind the mixture after the briquetting or tabletting process to provide the mixture in a form more suitable for chlorination. If calcining of clay has not been carried out in Step 1, above, it is done at this point. Certain alternatives to compression, including homogenizing the mixture and making a paste of the two materials with an organic binder, are also effective in promoting chlorination. Further, addition of NaCl serves to promote the reaction and enhance conversion and selectivity, and addition of this material, if any, to the ore-carbon mixture is done prior to compression.

4. The admixture of carbon, clay, and promoters, if any, is next chlorinated at approximately 700°–1000°C. Treatment of the mixture with chlorine alone is a reasonably effective means of chlorination, however, addition of some carbon monoxide proves to be a desirable means of accelerating the chlorination step. In addition, it has been found that carbon tetrachloride chlorinating agent and use of some of this material to accelerate to promote the chlorination step is sometimes desirable.

Further, chlorination can be conducted in a fluidized bed, a shaft furnace, or anyone of the other common pieces of equipment which are utilized in chemical and metallurgical processing to contact reactive gases with solids.

The following examples will serve to better illustrate the means of utilizing these embodiments in a practical scheme for producing aluminum trichloride.

EXAMPLE 1

Figure 1:
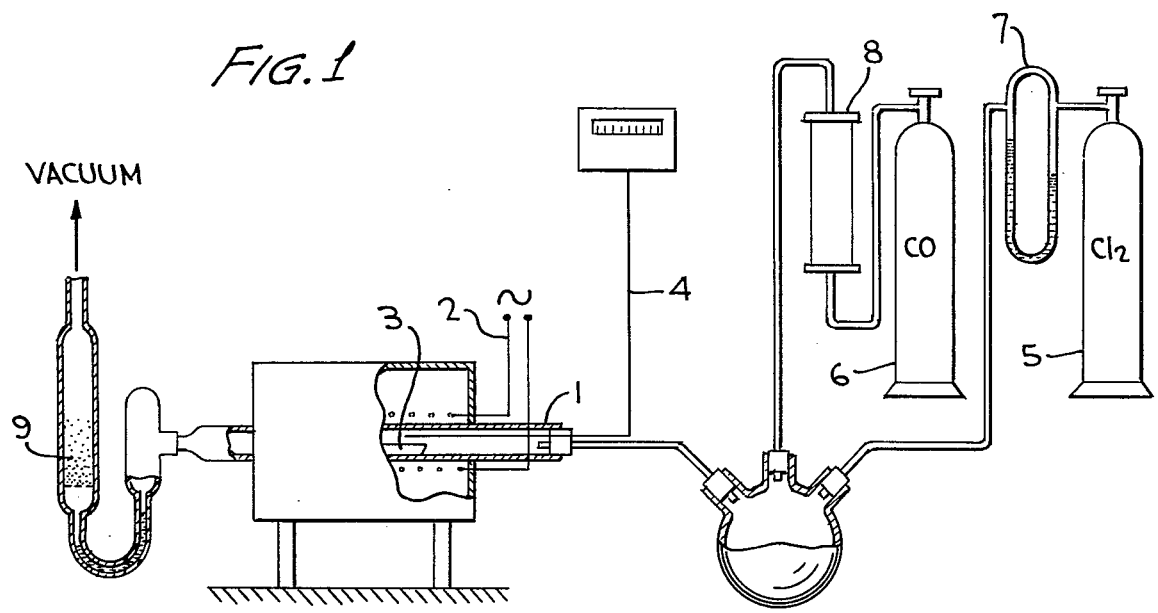
FIG. 1 shows in diagrammatic form an experimental apparatus in which static bed carbo-chlorinations of aluminous material were carried out.

This example can best be understood by reference to FIG. 1, which is an abbreviated schematic diagram of the equipment which was used to conduct (on a laboratory scale) chlorination of aluminous material. Chlorination was carried out in a silica reactor tube 1 with an internal diameter of 20 millimeters. The tube was situated horizontally and equipped with an external electrical heating element 2 to give the desired chlorination temperature. The reactor tube arrangement was such that a silica boat 3 of 10 millimeter length could be placed within the reactor tube, and within the boat a thin layer of the material to be chlorinated could be placed. Chlorination temperature was measured by using a calibrated nickel chromium-nickel thermocouple 4. The thermocouple was covered with a silica guard sheath and protrudes into the reactor directly above the boat. Chlorine and carbon monoxide were metered from laboratory storage tanks 5 and 6 respectively into the reactor tube, the chlorine first passing through a differential manometer 7 and the carbon monoxide first passing through a rota-meter 8. These instruments had been previously calibrated in order that the respective flow rates of $Cl_2$ and CO could be accurately measured. Reactor heater construction was arranged to enable ultraviolet radiation of the boat from above by means of a UV lamp, and thereby test the efficacy of this technique for promotion of the reaction.

The gaseous reaction products which were evolved from chlorination were collected in a two-stage Groethe absorber 9 connected to the end of the reactor tube 1. These reaction products were absorbed in 2 Normal aqueous HCl solution and the ionic aluminum content of aliquot portions was measured by complexi-metric titration after dilution. From this measurement the $AlCl_3$ evolved could be determined. In order to follow the reaction as it proceeded, the absorber set-up was arranged such that collectors could be quickly changed when required. Reaction times could thus be varied, and the $AlCl_3$ evolved during different reaction time intervals could be measured.

The materials which were chlorinated in this Example were prepared in the following fashion. Air-dried kaolin and brown coal were comminuted separately, the materials were separated into three grain-size fractions, and these fractions were again air-dried at 135°C for 2 hours. Table 1 gives particle size distributions for the three fractions of brown coal; size distributions for the kaolin fractions would be comparable. It should be noted that when kaolin and brown coal were comminuted together, the required size reduction of coal could not be attained, or could be achieved only after very long comminution times. Microscopic investigation of the grain-size distributions showed that for mixtures comminuted in this way, the brown coal particles became coated with a thin kaolin layer, and this protective coating made the further comminution of the coal particles difficult.

The compacting of the comminuted materials as well as the alternative mixing of the materials with a binder to form a dough-like paste, is to obtain an extremely close and intimate mixture. The interstitial spacing between the particles of the so treated mixture is less than would occur with normal mixing.

With respect to the compacting pressure, this can be up to 15 t/cm² and preferably 7 t/cm².

Table 1

Particle Size Distribution of Different Fractions of Brown Coal

| Size Range, μ | | | Fraction I | Fraction II | Fraction III |
|---|---|---|---|---|---|
| | | | Composition, % | | |
| 2.1 | − | 3.7 | 8.86 | — | — |
| 3.7 | − | 6.6 | 21.64 | — | — |
| 6.6 | − | 12.0 | 14.84 | 1.92 | — |
| 12.0 | − | 20.0 | 13.60 | 15.43 | — |
| 20.0 | − | 36.0 | 25.55 | 43.33 | 0.80 |
| 36.0 | − | 63.0 | 10.09 | 35.43 | 17.82 |
| 63.0 | − | 80.0 | 3.29 | 2.80 | 18.00 |
| 80.0 | − | 90.0 | 2.13 | 1.09 | 15.50 |
| 90.0 | − | 100.0 | — | — | 23.65 |
| 100.0 | − | 120.0 | — | — | 19.65 |
| 120.0 | − | 160.0 | — | — | 4.45 |
| 160.0 | − | 200.0 | — | — | 0.17 |

After the grain-size fractions of kaolin and brown coal had been separated by sifting, portions of the second fractions of each (Fraction II of each) were mixed in the ratio of 60 parts by weight of kaolin and 40 parts by weight of brown coal, the mixture was dried, and then completely homogenized. Grain-size distribution analysis after homogenization showed that no substantial change in the grain-size distribution of coal occurred, however, kaolin was further comminuted by homogenization. This fine comminution of kaolin caused no special problems in subsequent treating of the material. From these homogenized mixtures, tablets were compressed at a pressure of 7t/cm². The weight of the single tablets was 1 - 1.2 g. As a final step prior to chlorination, the tablets were again comminuted to particles of 100 - 500 μ.

In order to calcine the mixture, 0.8 - 2.5 g was weighed into the boat, and the reactor was heated to calcination temperature. During calcination a mixture of $N_2$ and CO was passed over the solid to flush any volatile matter as it was formed. Heating time averaged about ¼ hour, while calcination time was ¾ hour.

Above 400°C, water condensation was observed at the colder parts of the calcining tube, and after attainment of 600°C, tar deposition. This continued as the brown coal was coked, but was completed during the first ½ hour, and during the last 15 minutes of calcination no tar deposition was observed. However, after introduction of chlorine, a black deposition was again observed. This might have been tar, but a more likely possibility was the formation of a ferrous chloride mirror. At a calcination temperature of 650°–700°C, which was established as a desirable temperature level, water chemically bound in kaolin can be partly removed; in addition, this was an advantageous temperature from the point of view of the coking of brown coal.

Following calcination, reactor temperature was raised to the desired point for chlorination and a mixture of chlorine and carbon monoxide was passed to the reactor set-up. The weight ratio of chlorine to carbon monoxide was 4/1 to 20/1 for the six experimental runs carried out in this Example. Detailed results of these chlorination experiments are given in Table 2. Chlorinations were carried out for up to two hours; within this length of time a high degree of chlorination of $Al_2O_3$ occurred. The extent of chlorination was determined from the total weight of $Al_2O_3$ in the mixture to be chlorinated, which consisted of the sum of the weights of $Al_2O_3$ in kaolin and in brown coal. The quantity of $Al_2O_3$ available for chlorination could thus be obtained from the weight of kaolin and brown coal, and from the composition of each as determined by X-ray spectroscopy. The quantity of ionic Al, absorbed in the Groethe apparatus, was determined by complexometric titration with ethylene diamine tetra-acetic acid. With this method, $AlCl_3$ could be determined selectively in the presence of $FeCl_3$ and $TiCl_4$. Conversion values were thus the ratio of ionic Al (from $AlCl_3$) to total Al present initially (from $Al_2O_3$) in both kaolin and brown coal.

Table 2

Experimental Results — Static Bed Experiments

| Example No. | Run No. | Calcination Time (hr) | Calcination Temp (°C) | Chlorination Time (hr) | Chlorination Temp (°C) | Composition of Sample Kaolin (g) | Composition of Sample Brown Coal (g) | Composition of Sample NaCl (g) | $Al_2O_3$ Introduced (mg) | Residue Weight (g) | Residue $SiO_2/Al_2O_3$ | Ionic Al Found (mg) | Conversion % |
|---|---|---|---|---|---|---|---|---|---|---|---|---|---|
| 1 | 1 | ¾ | 650 | 1+½+½ | 700 | 0.4900 | 0.3267 | 0.0000 | 180 | 0.1801 | 3.1 | 46.9+13.9+6.0 | 48.2; 63.8; 70.4 |
|  | 2 | ¾ | 650 | 1+½+½ | 700 | 0.5989 | 0.3993 | 0.0000 | 223 | 0.2570 | — | 66.3+ 5.3+3.0 | 56.2; 60.7; 63.2 |
|  | 3 | ¾ | 700 | 1+1 | 800 | 1.5040 | 1.0027 | 0.0000 | 596 | 0.3960 | 1.7 | 133.9+56.6 | 42.5; 60.4 |
|  | 4 | ¾ | 700 | 1+1 | 850 | 1.5324 | 1.0216 | 0.0000 | 608 | 0.2589 | 2.6 | 197.0+46.0 | 61.3; 75.5 |
|  | 5 | ¾ | 700 | 1+1 | 950 | 1.5031 | 1.0022 | 0.0000 | 596 | 0.1928 | 3.0 | 229.9+21.5 | 72.9; 79.7 |
|  | 6 | ¾ | 700 | 1 | 1000 | 1.5076 | 1.0051 | 0.0000 | 598 | 0.2657 | 2.5 | 229.9 | 72.7 |
| 4 | 7 | ¾ | 700 | 1+1 | 950 | 1.4263 | 0.9508 | 0.1188 | 566 | 0.2143 | 10.0 | 257.6+33.6 | 86.0; 97.2 |
|  | 8 | ¾ | 700 | 1+¾ | 950 | 1.4285 | 0.9522 | 0.1190 | 567 | 0.3158 | 10.6 | 197.3+68.9 | 65.8; 88.7 |
| 5 | 9 | ¾ | 650 | 1 | 690 | 0.6710 | 0.1339 | 0.0424 | 271 | 0.4951 | — | 8.6 | 6.0 |
| 8 | 10 | ¾ | 700 | ½+½+½ | 750 | 1.5995 | 0.3998 | 0.0000 | 625 | 0.8076 | — | 44.9+24.2+41-.4 | 15.6; 20.9; 33.4 |
|  | 11 | ¾ | 700 | ½+½+½ | 850 | 1.5978 | 0.3995 | 0.0000 | 625 | 0.8396 | — | 36.2+48.9+34-.1 | 10.9; 26.7; 36.1 |
|  | 12 | ¾ | 700 | ½+½+½ | 750 | 1.7193 | 0.4298 | 0.0000 | 683 | 1.1110 | — | 43.6+22.9+39-.5 | 12.4; 13.4; 29.3 |
|  | 13 | ¾ | 700 | 1+½ | 750 | 1.5053 | 1.0035 | 0.0000 | 615 | 1.1782 | — | 146.1+65.4 | 44.9; 65.0 |
|  | 14 | ¾ | 800 | 1+1 | 950 | 1.5043 | 1.0028 | 0.0000 | 614 | 0.5086 | — | 165.5+89.7 | 51.0; 75.6 |

As can be seen from data given in Table 2, for Runs 1 through 6 conversion of $Al_2O_3$ after one hour ranged from about 48% up to about 73%, whereas after two hours conversion ranged from approximately 60% to about 80%. In addition to $Al_2O_3$ conversion data, an indication of selectively of the chlorination can be gained from spectroscopic measurements of $SiO_2/Al_2O_3$ ratio in the residues of selected runs. Ratios of 1.7 to 3.0 were obtained at the experimental conditions given in Example 1; these compare favorably with a starting $SiO_2/Al_2O_3$ ratio for each of these runs of about 1.1. From these data it is apparent that chlorination of kaolinitic clay can be accomplished very readily under the conditions given.

Figure 2:
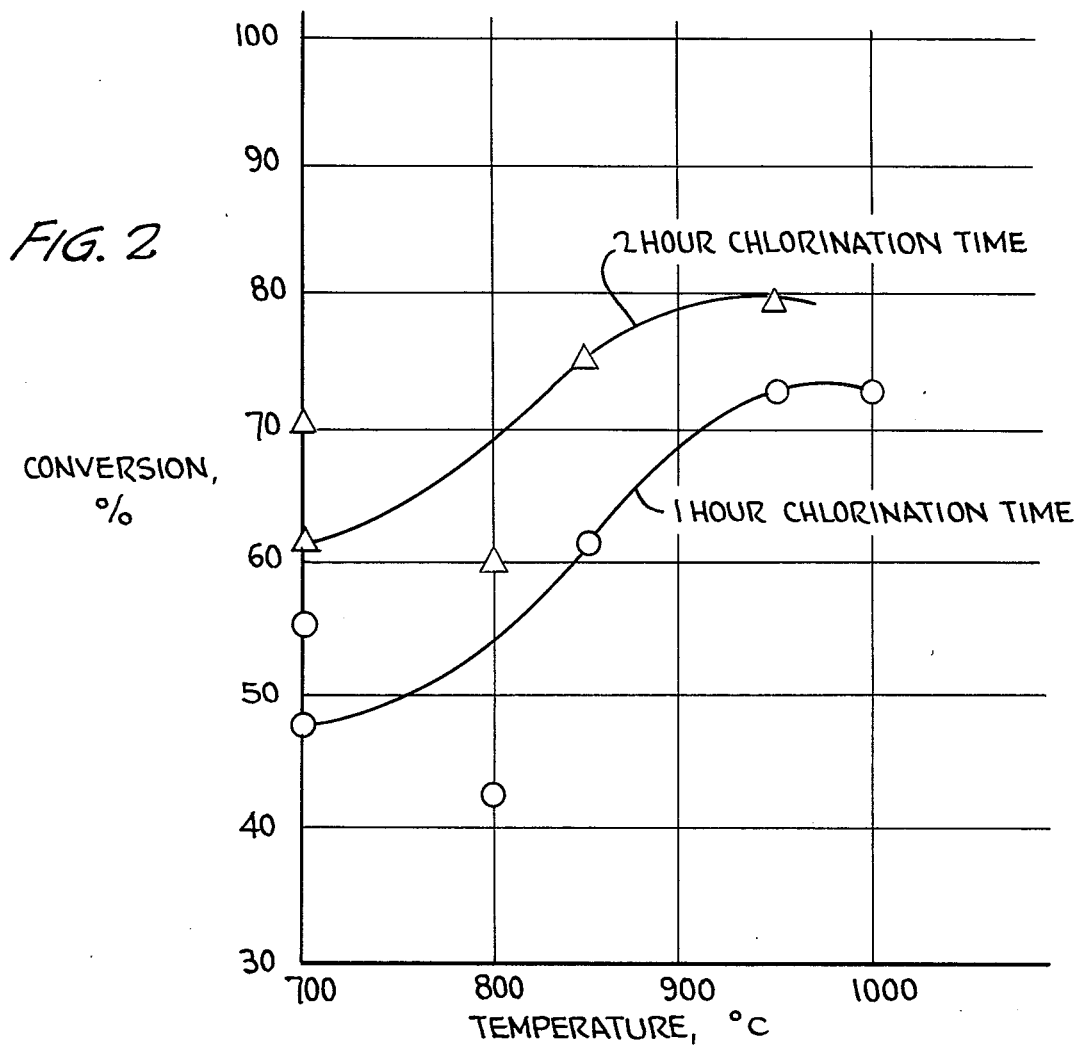
FIG. 2 is a graph showing the effect of temperature of chlorination on conversion of $Al_2O_3$ to $AlCl_3$ after one-hour and two-hour chlorination intervals.

In addition to demonstrating the utility of this new process method for carrying out the carbo-chlorination of clay, the data shown in Table 1, Runs 1 through 6, enable the influence of chlorination temperature on conversion to be established. This influence is graphically illustrated in FIG. 2, which plots conversion of $Al_2O_3$ to $AlCl_3$ for kaolinitic clay - brown coal mixtures for the temperature range of 700°–1000°C. Data is presented for chlorination times of both one and two hours. As can be seen with this method of processing chlorination can be effectively carried out at temperatures as low as, or even lower than 700°C, but the chlorination rate becomes progressively more rapid as the temperature is increased up to about 950°C. At approximately this temperature level the rate of chlorination approaches a maximum, and chlorination becomes less rapid at temperatures higher than about 950°C. While the precise mechanisms which cause the chlorination rate to pass through a maximum at about 950°C are not well understood, they are thought to be a result of the operation of two distinct, competing phenomena. The first of these phenomena is the straightforward and predictable increase in chlorination rate with temperature in the 700°–950°C temperature range. Such increase is undoubtedly based on a corresponding increase in the kinetic rate of the chlorination reactions and/or an increase in the rates of mass transfer which occur in the complex heterogeneous reaction system. However, at temperatures approaching 900°C, a second and competing phenomenon is thought to become important, i.e., conversion of the clay from the initial kaolinitic crystalline form to one or more of the other crystalline forms of silica and alumina, including mullite, which are less susceptible to chlorination. It is thus the interplay between these two competing factors which is thought to cause an optimum temperature of about 950°C for the experimental conditions given in Runs 1 through 6. This finding has been substantiated by other, similar chlorinations of clay outlined in later examples.

EXAMPLE 2

In the preceding example, both brown coal and clay were comminuted to approximately 12 to 63 $\mu$ prior to admixing, compression, calcining, and chlorination. In order to more clearly determine the influence of the various factors involved in carbo-chlorination of aluminous material, the effect of comminution on the rate and extent of chlorination of clay-brown coal mixtures was investigated in this example. This was accomplished by preparing mixtures of pulverent brown coal and clay of different size fractions than those used in Example 1.

Figure 3:
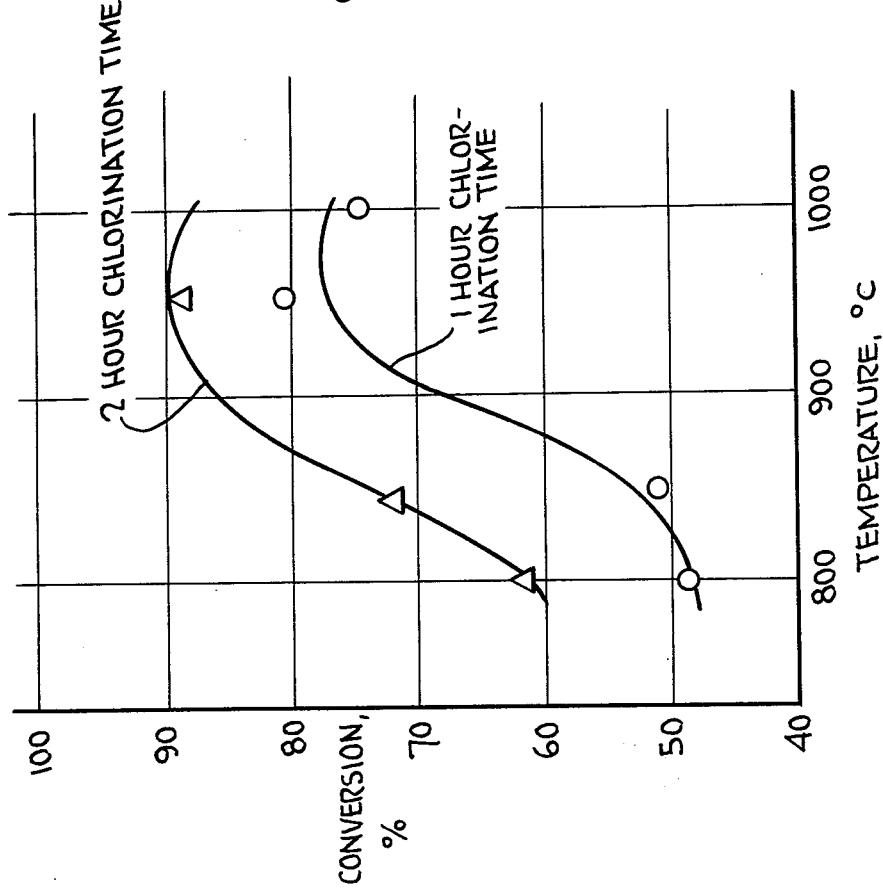
FIG. 3 is a graph showing conversion of $Al_2O_3$ to $AlCl_3$ after 1 and 2-hour chlorination times as a function of temperature for raw materials comminuted to a greater degree than those used to derive FIG. 2, and thereby shows the effect of comminution on chlorination.

In the first case brown coal and clay were ground, sifted, and the size fractions of each corresponding to Fraction I, Table 1, were mixed, compressed, recrushed and then calcined and chlorinated in a fashion exactly analogous in all respects to the chlorinations detailed in Example 1. As can be seen from the grain size data in Table 1, the coal-clay mixture consisted primarily of particles of 3–36 $\mu$. The results of this series of experiments are shown in FIG. 3, which plots conversion of $Al_2O_3$ to $AlCl_3$ as a function of temperature at this higher degree of initial comminution. By comparing FIGS. 2 and 3, it can be seen that conversion is slightly enhanced by greater comminution at temperatures but the effect is not dramatic.

In the second case brown coal and clay of particle grain sizes corresponding to Fraction III, Table 1, were used in the chlorinations; for this material preponderance of particles fit into the 36–120 $\mu$ size range. Again, the technique employed in this case was exactly similar to that used in Example 1. In this case the extent of chlorination is somewhat less after only one hour of chlorination, but approximately the same after two hours of chlorination. From the comminution data in Examples 1 to 2 it is apparent that chlorination is quite effective using the new technique described in the foregoing for a wide range of particle grain sizes, including the range of approximately 2 to 200 $\mu$.

EXAMPLE 3

Figure 4:
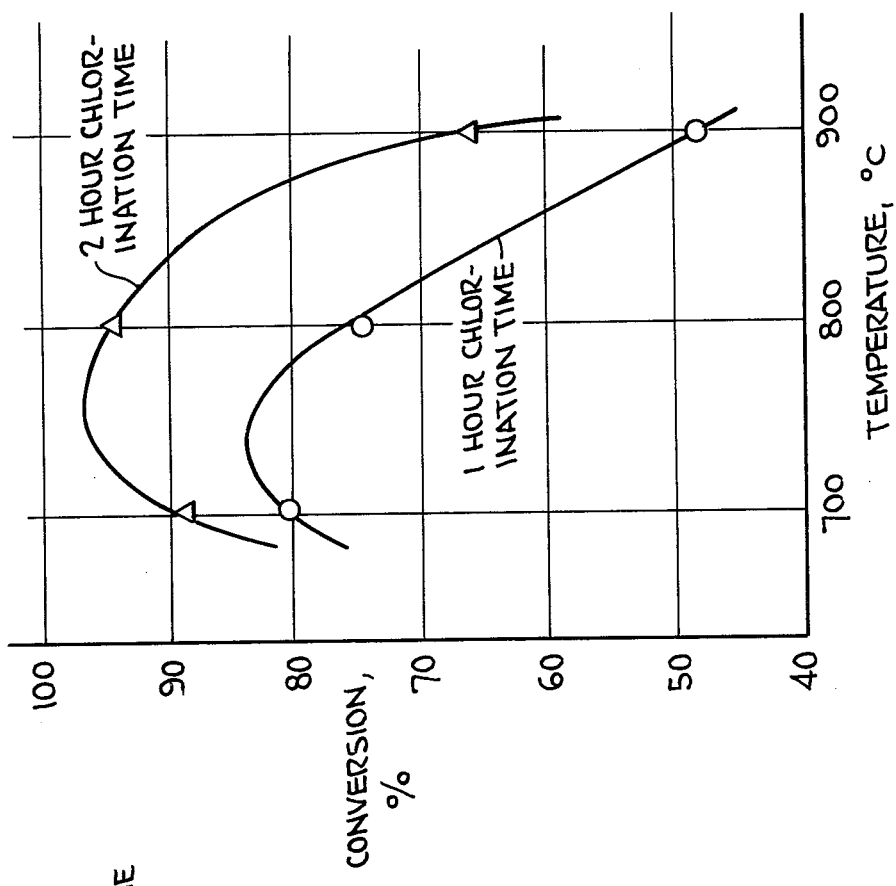
FIG. 4 is a graph showing the effect of the temperature of calcination on conversion during chlorination for chlorination times of 1 and 2 hours.

To illustrate still further the relative effects of the various variables which influence carbo-chlorinations of clay, additional data were obtained utilizing the laboratory apparatus shown in FIG. 1. This data was measured using particle size distributions and experimental techniques which were identical to those employed in Example 1, except that calcination was carried out at higher temperatures. All of the data in this example were obtained with a chlorination temperature of 950°C. These results were presented in FIG. 4 together with appropriate results from Example 1. It is apparent that a relatively broad range of calcination temperatures can be used to dry the system, remove most of the water of combination present in clay, and partially coke the brown coal. As with chlorination, however, conversion exhibits a maximum temperature, in this case it is at a calcination temperature of about 700°C. This is again due presumably to a balance of factors: at the lower temperatures water is less completely removed and the extent of coking is less, thereby hindering chlorination, whereas at higher calcination temperatures formation of more stable intercrystaline forms of alumina and silica hinder latter chlorination of the aluminous material.

EXAMPLE 4

While the foregoing Examples indicate excellent results can be obtained by practicing the current invention in the chlorination of low grade aluminous material with low grade coal as reductant, it has been found that even further enhancement of conversion and selectivity can be obtained through the use of certain reaction promoters. This was illustrated in a convincing fashion by the following procedure. After mixing the grain size Fractions II of both clay and brown coal, 5 weight % sodium chloride was added, the mixture containing sodium chloride was compressed into tablets at 7 tons/cm², these tablets were then crushed, added to the reactor system, calcined, and chlorinated as in the foregoing Examples 1 through 3. The reaction conditions and experimental results of this work are detailed in Runs 7 and 8, Table 2, and convincingly demonstrate that addition of sodium chloride serves as a very effective promoter for the chlorination reaction. To illustrate, under conditions essentially identical to those for Run No. 5, Example 1, conversion is comparatively increased somewhat for Run 7 after 1 hour, and slightly less for Run 8 after one hour chlorination time. However, conversion in both Runs 7 and 8 is enhanced very significantly over Run 5 after two hours of chlorination. Of perhaps more importance is the greatly improved selectivity for chlorination in clay-brown coal mixtures to which sodium chloride has been added as a promoter. This fact is amply illustrated by the $SiO_2/Al_2O_3$ ratio for Runs No. 7 and 8; in these experimental runs the $SiO_2/Al_2O_3$ ratio is approximately 10, far greater than the 1.7 – 3.1 ratio found without the addition of sodium chloride.

EXAMPLE 5

The preceding examples illustrate a new and novel technique for treating comparatively economical and low grade raw materials, and simultaneously give ranges of experimental conditions to enable operation of a process to very effectively conduct carbo-chlorinations of aluminous material utilizing low grade brown coal, either with or without the addition of sodium chloride as a promoter. To clearly establish the unexpected and beneficial effects of the foregoing procedure, chlorination of a mixture of brown coal and clay was conducted using experimental conditions identical to those in Runs 1 and 2 in Example 1, but without the intimate homogenization and compression utilized for the starting material for these two runs. The results of chlorination without compression are given in Run 9. As can be noted the beneficial effect of providing initimate contact between the aluminous material and reductant by compressing the brown coal and clay mixture is truly dramatic; in Runs 1 and 2 (with tabletting) conversions of approximately 50% were achieved after one hour, whereas for Runs 9 (without tabletting) only 6% of the $Al_2O_3$ was converted to $AlCl_3$ after one hour of chlorination. It should be stressed that except for the tabletting procedure, pretreatment and calcination and chlorination conditions were essentially identical. The only difference of any significance was the inclusion of 5 weight % sodium chloride in the material to be chlorinated in this example, and as shown by Example 4 use of sodium chloride would have a positive effect. The efficacy of techniques described in Examples 1 through 4 for treating the carbonaceous and aluminous materials to obtain a very intimate mixture is thus readily apparent.

While a precise understanding of the reasons for effectiveness of the above method of treatment is not available, it is through that the exceptionally rapid and effective chlorinations, which result when the aluminous material and reductant are compressed together to give a very intimate mixture, are due to at least one or more of the following factors:

1. As a result of pyrolysis of volatile organic components from the coal during calcination and/or chlorination, carbonaceous material is deposited deep into the pores of the clay, and this later intensifies the reducing conditions which are required for chlorination.

2. The volatile organics have positive effect, during calcination and/or chlorination, on the intercrystalline phases and surfaces of the clay or aluminous material which enhances its reactivity.

3. After calcination the brown coal or borwn coalclay admix has a high degree of porosity, which improves the contact between chlorination-reduction gases and the solid material.

4. Some of the components of the ash exert a catalytic effect.

5. Due to an inhibiting effect on oxidation or chlorination of the carbon by the clay or the high ash content of the brown coal, the carbon is present for a prolonged period of time, and continues to facilitate chlorination.

EXAMPLE 6

Because of the excellent and unexpected results obtained for the carbo-chlorinations described in Examples 1 through 4 it was decided to investigate another technique for obtaining a very intimate mixture of aluminous ores and carbonaceous materials. This technique consisted of preparing a paste of the aluminous and carbonaceous materials with an appropriate organic binder; this paste is subsequently dried, crushed, and chlorinated.

The equipment used to study chlorination of such material was somewhat different than that described in Example 1 and utilized in Examples 1 through 5. In the current example chlorinations were conducted in a small fluidized bed. This example can best be understood by referring to FIG. 5, which is a schematic diagram of the experimental apparatus. The main part of the chlorinating unit was a silica reactor tube 1 of 46mm ID and 50mm OD. The overall length was 650mm, with a heated section 2 length of 410mm. A silica frit 6 of porosity POR-1 was sealed into the tube as an underplate at a height of 300mm. The reactor tube was heated by two resistance wire coils 3, directly wound onto the wall of the tube. Power input to each wire was up to 1 kw. Accurate control of the reactor temperature was achieved using regulators 4, a drop strap in addition to thyrister voltage regulators. A nickel/chromium-nickel sensing thermo-couple 5, situated in a silica sheath, was used to control the regulators 4; the sheath protruding into the inlet gas flow, directly below the frit.

The temperature in the fluidized bed (i.e., the calcination temperature and subsequent chlorination reaction temperature), was measured by means of another nickel/chromium-nickel thermocouple 7, also located in a silica sheath and penetrating from above into the center of the fluidized bed. A 300mm OD heat insulating layer 8 lined with profilated refractory bricks was provided to reduce heat losses.

The experiments were carried out as follows. Nitrogen, used as a carrier gas to improve fluidization; carbon monoxide, to provide for an appropriate reducing atmosphere; and chlorine, for the actual chlorination; were taken from storage bottles (not shown) and dried by bubbling through vessels filled with silica gel and sulfuric acid. The flow rates of the dry gases were measured using calibrated rotameters 9, and the gases were fed into a mixer 10. The gas mixture of appropriate composition then left the mixer to enter the preheater at the bottom of the fluidizing equipment and, after having passed the frit 6, to flow through the solid pulverent coal-clay mixture. The gases and gaseous reaction products, after passing through the reactor tube 1, were carried to a stainless steel head 11 with a diameter increasing upwards to an ultimate diameter of 100mm.

This construction served to partially separate any flue dust formed during drying or chlorination. The gases leaving the head 11 were conducted through a cyclone 12 where residual flue dust was precipitated. To prevent early condensation of the product, both the cyclone and connecting lines were heated electrically. The temperature of the gas leaving both the cyclone 12 and head 11 was measured by means of mercury thermometers 13.

A portion of the products of the chlorination was separated in an air-cooled condenser 14 equipped with a manually operated scraper. In addition, two water-cooled series-connected collectors 15 were connected to the condenser, followed by wet washers 16 and an alkaline washer 17 filled with a 60 percent NaOH solution. In this way, all volatile products can be effectively trapped. The system was pumped by a vacuum pump 18 through a liquidgas separator 19 in order to reduce the resistance of the collector system. The rate of pumping was so adjusted that a pressure drop of 1 to 2mm Hg was read on U-pressure gauges 20 shunting the fluid bed reactor 1.

About 50 to 150g of a given grain size material was used for each chlorination experiment. The equipment was first pre-heated to 400–500°C while flushing with air, it was next flushed with $N_2$ and, finally, with gas flow rate reduced to a minimum, charged with the material to be chlorinated through a movable pipe 21a penetrating into the reactor through its head 11. The same pipe served as a means for intermediate sampling. After the experiment had been completed, this pipe also was used to withdraw non-chlorinated material from the reactor.

At the end of the reaction period, the chlorine feed was stopped and the system was flushed with $N_2$ gas and then cooled in $N_2$ flow. The dust-like product which was collected in the condenser 14 was analyzed for ionic Al, and the Al content of the solution from each washer 16 and 17 was also determined. The $Al_2O_3$ and $SiO_2$ content of flue dust precipitated in the cyclone 12, and that of the non-chlorinated residue, was determined by X-ray fluorescence spectrometry.

In the first experiment (Run No. 1, Table 3) conducted with this fluidized bed apparatus the material to be chlorinated was prepared as follows: 47.6% kaolinitic clay, 47.6% brown coal, 2.3% carboxymethylcellulose as binder, and 2.3% perlite were milled together and the dough-like mass was dried and granulated. This milled, dried, and granulated. Again, from detailed data in Table 3, conversion after one hour of chlorination at 760°C was 42.8%.

In order to illustrate clearly the efficacy of forming a very intimate mixture of reductant aluminous material by milling with a binder to form a doughlike paste, an additional experiment was carried out. The experiment (Run No. 3, Table 3) was similar in all respects to the first two runs described in this example, except that a binder was not used in this case. As can be noted from those data presented in Run 3, Table 3, a conversion level of only 2.8% was achieved after 1 hour of chlorination at 900°C, i.e., at a temperature of 140–200°C higher than for the preceding two runs. From these three experiments it is apparent that an unexpected increase in conversion of more than 15-fold occurs as a result of the formation of an extremely intimate, close mixture of aluminous and carbonaceous materials through milling and the use of an appropriate binder.

EXAMPLE 7

In the preceding example (Example 6) a fluidized bed apparatus was used to demonstrate the effectiveness of using a binder in preparing charge material for chlorination. In the current example this equipment was used to further test preparation of various charge materials by compressing together the carbonaceous and aluminous materials. Detailed experimental data for this example are also presented in Table 3, Runs 4 through 6.

In the first experiment in this example a mixture of 50% kaolin and 50% brown coal was compressed, charged to the apparatus, calcined and chlorinated. The experimental procedure followed was identical to that given in Example 6, and results are shown in Table 3, Run No. 4. For the second experiment and third experiments in this example (Run Nos. 5 and 6, Table 3) both kaolin and brown coal were comminuted to a fineness below 63 $\mu$, the powders were mixed in the ratio of 60% kaolin and 40% brown coal, the mixture was compressed into large pieces, and after comminution the desired grain fraction was separated. For Run No. 5 the granulate size was 500–1000 $\mu$, whereas for Run No. 6 particles of 0.5–1.0cm were utilized. Before chlorination, the raw materials were calcined and coked in another fluidized bed reactor in an 3:1 ratio $N_2$:CO gas stream. During calcination, a certain amount Table 3

| | | Experimental Results — Fluidized Bed Experiments | | | | | | | | |
|---|---|---|---|---|---|---|---|---|---|---|
| | | Calcination | | Chlorination | | $Al_2O_3$ | Residue | | Ionic Al | |
| Example No. | Run No. | Time (hr) | Temp (°C) | Time (hr) | Temp (°C) | Introduced (g) | Weight (g) | $SiO_2Al_xO$ | Found (g) | Conversion (%) |
| 6 | 1 | 0.5 | 680 | 1.0 | 700 | 15.2 | 21.6 | 1.5 | 3.415 | 42.7 |
| | 2 | 0.5 | 680 | 1.0 | 760 | 31.6 | 62.1 | — | 7.126 | 42.3 |
| | 3 | 0.33 | 700 | 1.0 | 900 | 36.7 | 66.0 | 1.2 | 0.535 | 2.8 |
| 7 | 4 | 0.5 | 680 | 1.0 | 700 | 23.3 | 42.6 | 1.2 | 4.880 | 39.0 |
| | 5 | 0.5 | 750 | 2.0 | 930 | 29.7 | 18.0 | — | 10.44 | 66.5 |
| | 6 | 0.5 | 750 | 2.0 | 930 | 34.1 | 17.0 | — | 14.23 | 78.9 | material was then charged to the apparatus, calcined, and chlorinated. As can be seen from the detailed experimental data given in Table 3, conversion of 42.7% of the $Al_2O_3$ to $AlCl_3$ occurred in only one hour of chlorination at 700°C.

In the second experiment (Run No. 2, Table 3) a similar technique was employed for pretreatment of the charge material, but in this case 60% kaolinitic clay, 38% brown coal, and 2% of a low sulfite binder were of further comminution occurred, thus decreasing the average particle size somewhat. Following calcination the granulate was transferred to the fluidized bed reactor for subsequent chlorination. Extent of chlorination for Runs 5 and 6 are given in Table 3; as can be seen chlorination was quite effective using the described procedure.

EXAMPLE 8

In each of the preceding examples the aluminous material utilized was kaolinitic clay and the carbonaceous material was brown coal. In order to investigate more fully the general utility of extremely intimate mixing achieved by grinding, admixing, and compression of raw materials, in this example a spectrum of materials were prepared, charged in turn to the experimental apparatus described in Example 1, calcined, and chlorinated. Table 4 is a list of the raw materials used in this example; in each case the kaolinitic clay was air dried at 135°C for two hours and then comminuted. This material was mixed at the indicated proportion with coke, also previously comminuted, and the admixture compressed to 7 t/cm². The type of coke used in each case is also shown in Table 4. This mixture was then crushed, charged to the reactor system, further calcined and chlorinated. Details of each experiment, together with results of the chlorinations, are summarized in Table 2 as Runs 10–14. General experimental technique was the same as that Table 4

Example 8 — Specifications of Raw Materials

| Run No. | Kaolin (%) | Coke (%) | Method of Coke Preparation | | |
|---|---|---|---|---|---|
| | | | Starting Material | Coking Time (hr) | Coking Temp (°C) |
| 10 | 80 | 20 | Sugar | 2 | 800 |
| 11 | 80 | 20 | Sugar | 2 | 800 |
| 12 | 80 | 20 | Brown Coal | ¾ | 700 |
| 13 | 60 | 40 | Brown Coal | ¾ | 700 |
| 14 | 60 | 40 | Brown Coal | ¾ | 700 | employed in Examples 1 through 5. The excellent results obtained for chlorinations shown in Table 2 under example 8 amply illustrate the utility of the described treatment and processing for a wide variety of carbonaceous materials.

EXAMPLE 9

In Example 8 and in the foregoing examples, it was shown that if extremely intimate mixtures of various carbonaceous and aluminous materials are formed by the methods and techniques described herein, they can be very readily and effectively chlorinated to give high yields of aluminum trichloride. To more fully explore the effects of the various variables in such carbo-chlorinations one further species of experimental tests was conducted using the apparatus of Example 1. In ach of these experiments brown coal coke, prepared by coking for ¾ hour at 700°C, was comminuted, there was admixed with air-dried and comminuted kaolin in the ratio of 60 parts kaolin to 40 parts coke, an intimate mixture of the two materials was formed by compressing the mixture to 7 t/cm². The compressed material was then granulated, and the granular material was chlorinated in the apparatus of Example 1, and employing the experimental technique of Example 1.

The results of this series of requirements are shown in abbreviated form in Table 5, which gives conversions of alumina to aluminum trichloride after one and two hours reaction times. Chlorination was carried out with a gaseous stream containing 62.5 volume % chlorine, the balance being carbon monoxide. In each one the compressed mixture was calcined for ¾ hour prior to chlorination.

The experimental data again shows that chlorination is quite effective employing the methods described herein. Close scrutiny of the data shown indicates that for these particular mixtures the optimum temperature of calcination is in the vicinity of 900°C, whereas the optimum chlorination temperature is about 850°C. These data, taken together with those results presented earlier, serve to show that while some variability in the precise optimum processing conditions is to be expected, depending on the raw materials employed, excellent results can be achieved for carbo-chlorinations using the herein described techniques and employing a range of conditions broad enough to be easily attained through common engineering practice.

Table 5

Example 9 — Experimental Results

| Run No. | Calcination Temperature/°C | Chlorination Time/hr. | Chlorination Temperature/°C | Conversion % | |
|---|---|---|---|---|---|
| 1 | 700 | 1+½ | 750 | 44.9 | 65.0 |
| 2 | 700 | 1+1 | 850 | 74.7 | 92.1 |
| 3 | 700 | 1+1 | 950 | 44.4 | 73.9 |
| 4 | 800 | 1+1 | 950 | 51.0 | 78.6 |
| 5 | 900 | 1+1 | 950 | 69.8 | 88.5 |
| 6 | 800 | 1+1 | 950 | 63.3 | 87.1 |

EXAMPLE 10

Figure 6:
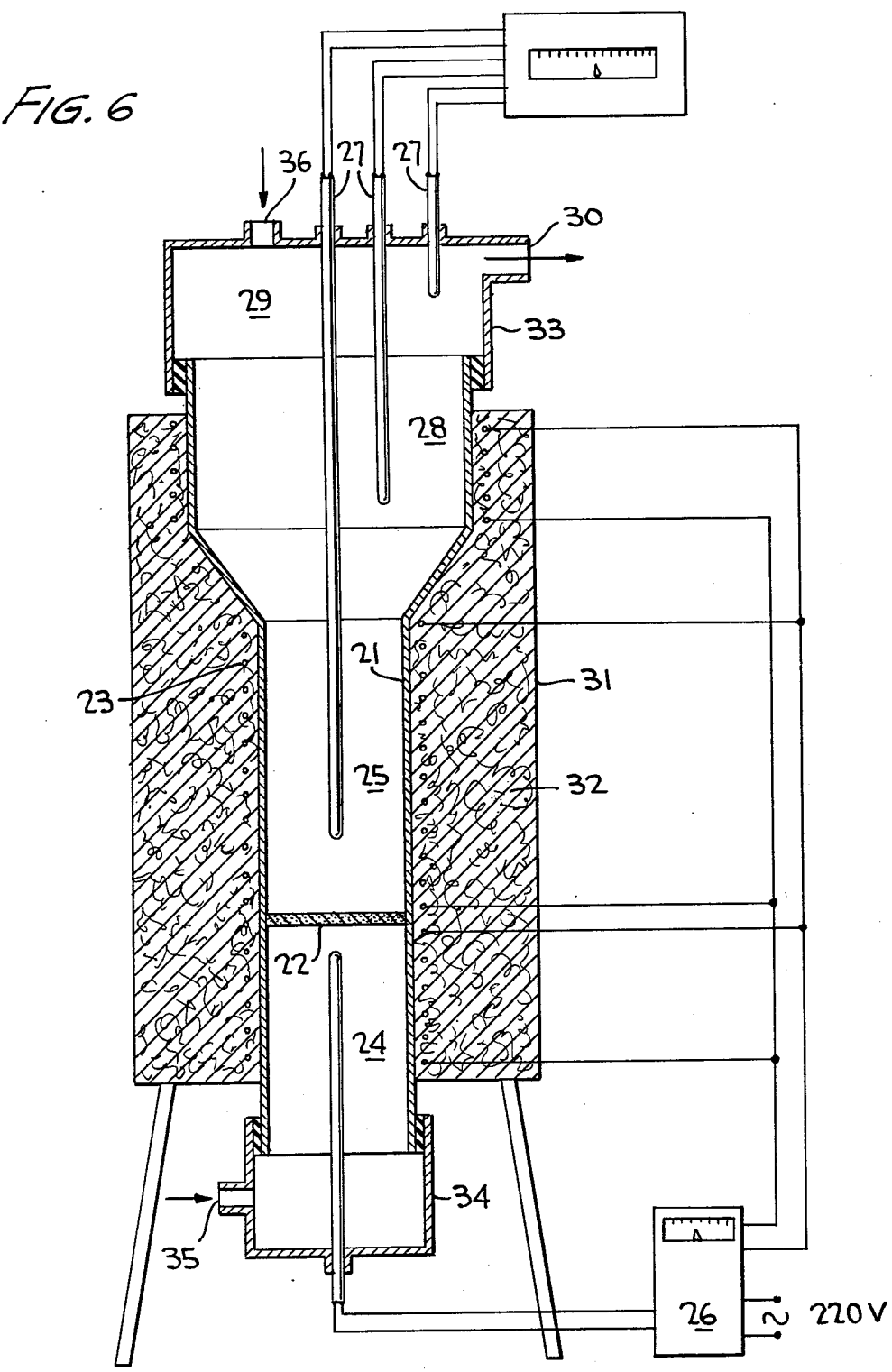
FIG. 6 shows in diagrammatic form a larger scale chlorination reactor wherein fluidized bed carbochlorinations of aluminous material were carried out in accordance with the invention.

In the preceding examples, experiments were carried out in either a small static bed apparatus or a small fluidized bed apparatus. These experiments will illustrate the efficacy of the previously described novel chlorination technique. In order to demonstrate that this technique and method for reductive-chlorination of aluminous materials can be extrapolated to larger scale equipment, experiments were conducted in the reactor depicted schematically in FIG. 6. The chlorination reactor was constructed from a quartz tube 21, the full length being 900mm. The internal diameter of the tube at the lower part of the apparatus, up to a length of 640mm, was 50mm, while the internal diameter of the upper part, in a length of 200mm, was 100mm. Between the two parts, there was a connecting part of conical design. A porous quartz frit 22 was sealed into the tube at the height of 300mm to hold the solid charge and to serve as a gas distribution plate.

The reactor was electrically heated by heaters 23. The part of the reactor below the frit was a preheater zone 24 serving to preheat the gases, whereas in the reaction zone 25 above the frit, the desired temperature was provided by two 1 kw heaters.

The heaters 23 were constructed of Kanthal A wire, wound directly on the wall of the reactor tube 21. Reactor temperature was maintained at the given desired value by an electro-mechanical temperature regulator 26 actuated by NiCr-Ni thermocouple, through thyristorized voltage regulators.

Above the frit, temperature was measured at three points with NiCr-Ni thermocouples housed in quartz protecting tubes 27. These measurements were made in the fluidized bed itself (reactor zone 25), in the upper, wider so-called "after-reaction zone 28", and in an upper head 29 of the apparatus at the gas exit port 30. To reduce heat losses, the reactor was surrounded with a metal mantle of 300mm diameter, and the annular space was filled with basalt wool as a heat insulator 32.

The upper header 33 and lower header 34 which are connected to the quartz reactor body were made of steel, and were attached by stuffing boxes to the reactor tube 21. Connections for gas inlet 35 and outlet 30, for the feed of the material to be chlorinated 36, and for thermocouple connections, were arranged at appropriate points in the lower and upper headers. It was found in the trial heating of the apparatus that when the after-reaction zone 28 was heated to 850°–900°C, the temperature of the upper head 29, with no additional heating, reached 500°–550°C, and at this temperature the head was attacked by chlorine. To protect against such attack, the head and the free part of the reactor body were cooled by blowing with compressed air. Thus, the temperature of the head was reduced to ~400°C.

A receiver system (not shown) was connected to the reactor, and reaction products were collected and analyzed in much the same fashion as previous examples. The experiments were also generally conducted in the same way as outlined in Example 6. The equipment was first preheated, then flushed with air and then nitrogen, and the material to be chlorinated was charged. This material was next calcined, and then chlorinated with the appropriate $Cl_2$-CO mixture. Folowing chlorination, the system was cooled in an $N_2$ and CO stream, this further served to carry over into the receiver system any $AlCl_3$ which might possibly be present in adsorbed form in the residue.

Charge materials for experiments in this equipment were prepared in the following fashion. Kaolin was air dried as in previous examples at 135°C for two hours. Coke was prepared from brown coal by heating at 750°C for 1 hour and by heating at 750°C for ¾ hour. Kaolin, brown coal-coke, and sodium chloride were then mixed in the following respective ratios: 66.6/28.6/4.8, and the mixture was compressed to give intimate contact between the components. The compressed mixture was next crushed to give particles of approximately 0.5–1.0cm diameter. These particles were charged to the reactor for calcination and subsequent chlorination.

Experimental conditions and results for both of these experiments (Runs 1 and 2) are shown in Table 6. As can be seen excellent conversion of alumina to aluminum trichloride was obtained in both of these experiments, thus demonstrating once again the effectiveness of the techniques described herein, and further illustrating their utility when applied to much larger equipment than that used in the earlier examples.

Table 6

|  |  | Run No. 1 | Run Nr. 2 |
|---|---|---|---|
| Calcination | time/hr. | ½ | ½ |
|  | temperature/°C | 750 | 750 |
| Chlorination | time/hr. | 2 | 2 |
|  | temperature/°C | 900 | 900 |
| Charge Material Introduced/g |  | 135.20 | 136.50 |
| Composition of Charge Material |  |  |  |
|  | C/g | 34.21 | 29.35 |
|  | H/g | 0.68 | 0.51 |
|  | $Al_2O_3$/g | 40.02 | 41.01 |
|  | $SiO_2$/g | 45.02 | 46.41 |
|  | Other/g | 15.27 | 18.32 |
| $Cl_2$ Introduced/g |  | 175.00 | 175.00 |
| CO Introduced/g |  | 37.90 | 37.30 |
| Conversion of Al |  | 65.50 | 62.30 |

What is claimed is:

1. A process for producing aluminum trichloride comprising the steps of: comminuting separately or together aluminous material selected from the group consisting of kaolin, illite and bauxite and low-grade sub-bituminous reductant selected from the group consisting of brown coal, lignite and coke, to a size range of from 2–200 $\mu$ diameter; admixing the two materials with an effective amount of sodium chloride up to 5% to increase the reaction rate and yield of aluminum trichloride; compacting said admixture at a pressure of an effective amount up to 15 t/cm² to form an extremely close and intimate mixture in the shape of tablets or briquets; crushing the tablets or briquets; calcining said crushed intimate mixture at a temperature of from 650°–900°C; and chlorinating the calcined intimate mixture at a temperature of from 700°–1000°C with a gaseous stream containing chlorine for from ¼ to 4 hours to form aluminum trichloride.

2. The process as claimed in claim 1 wherein said compacting is carried out on said materials at a pressure of 7 t/cm² to form said intimate mixture in the shape of tablets or briquets.

3. The process as claimed in claim 1 wherein said calcining step is carried out at a temperature of from 650°–700°C.

4. The process as claimed in claim 1 wherein said chlorination step is carried out at a temperature of 950°C.

5. The process as claimed in claim 1 wherein said chlorination step is carried out with a gaseous stream containing chlorine and carbon monoxide.

6. The process as claimed in claim 1 wherein said chlorination step is carried out for a period of from 1 to 2 hours.

* * * * *